(12) United States Patent
Zaafrani (10) Patent No.: US 8,453,135 B2
(45) Date of Patent: May 28, 2013

(54) COMPUTATION REUSE FOR LOOPS WITH IRREGULAR ACCESSES

(75) Inventor: Abderrazek Zaafrani, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 12/722,506

(22) Filed: Mar. 11, 2010

(65) Prior Publication Data

US 2011/0225573 A1 Sep. 15, 2011

(51) Int. Cl.
*G06F 9/45* (2006.01)
*G06F 9/44* (2006.01)

(52) U.S. Cl.
USPC .................. 717/160; 717/159; 717/161

(58) Field of Classification Search
USPC .................. 717/140–143, 158–163
See application file for complete search history.

(56) References Cited

U.S. PATENT DOCUMENTS

| | | | | |
|---|---|---|---|---|
| 5,530,866 A * | 6/1996 | Koblenz et al. | ............... | 717/144 |
| 5,822,593 A * | 10/1998 | Lamping et al. | ............... | 717/161 |
| 6,016,397 A * | 1/2000 | Ogasawara et al. | ........... | 717/160 |
| 6,064,819 A * | 5/2000 | Franssen et al. | ............. | 717/156 |
| 6,078,745 A * | 6/2000 | De Greef et al. | ............. | 717/151 |
| 6,286,135 B1 * | 9/2001 | Santhanam | ................... | 717/146 |
| 6,567,976 B1 * | 5/2003 | Wolf | ............. | 717/160 |
| 6,651,246 B1 * | 11/2003 | Archambault et al. | ....... | 717/160 |
| 6,952,821 B2 * | 10/2005 | Schreiber | ...................... | 717/151 |
| 7,089,545 B2 * | 8/2006 | Bera | ............. | 717/160 |
| 7,367,024 B2 * | 4/2008 | Barua et al. | ................... | 717/157 |
| 7,478,379 B2 * | 1/2009 | Bonaventure et al. | ........ | 717/161 |
| 7,669,194 B2 * | 2/2010 | Archambault et al. | ....... | 717/158 |
| 7,865,886 B2 * | 1/2011 | Plum | ............................. | 717/160 |
| 8,037,462 B2 * | 10/2011 | Archambault et al. | ....... | 717/149 |
| 8,060,870 B2 * | 11/2011 | Eichenberger et al. | ....... | 717/160 |
| 8,271,832 B2 * | 9/2012 | Gonion et al. | .................. | 714/10 |
| 8,281,295 B2 * | 10/2012 | Chen et al. | ..................... | 717/151 |
| 8,332,829 B2 * | 12/2012 | Mattson | ........................ | 717/140 |
| 8,375,375 B2 * | 2/2013 | Ren et al. | ...................... | 717/150 |

OTHER PUBLICATIONS

Schmidhuber, "Learning temporary variable binding with dynamic links", IEEE, pp. 2075-2079, 1991.*
Hancock et al, "An investigation of feedback guided dynamic scheduling of nested loops", IEEE, pp. 315-321, 2000.*
Lim et al,"Blocking and array contraction across arbitrarily nested loops using affine partitioning", ACM PPOPP, pp. 103-112, 2001.*
Ramanujam et al, "Reducing memory requirements of nested loops for embedded systems", ACM DAC, pp. 359-364, 2001.*

(Continued)

*Primary Examiner* — Anil Khatri
(74) *Attorney, Agent, or Firm* — Van Leeuwen & Van Leeuwen; David Dolezal (57) ABSTRACT

A compiler selects a nested loop within software code that includes an outer loop and an inner loop. The outer loop includes an outer induction variable and the inner loop includes an inner induction variable. The compiler identifies a computation included in the nested loop that generates an irregular array access, which includes an expression of both the outer induction variable and the inner induction variable. Next, the compiler identifies a redundant calculation for the computation based upon the outer induction variable and the inner induction variable, and generates a temporary variable to correspond with the redundant calculation. The compiler replaces the computation with the temporary variable in the nested loop and, in turn, compiles the nested loop with the included temporary variable.

20 Claims, 10 Drawing Sheets

OTHER PUBLICATIONS

Godefroid et al, "Automatic partial loop summarization in dynamic test genertaion", ACM ISSTA, pp. 23-33, 2011.*

Birch, Johnnie L., "Using the Chains of Recurrences Algebra for Data Dependence Testing and Induction Variable Substitution," Fla. State U., 2002.

F. Chow, S. Chan, R. Kennedy, S. Liu, R. Lo, and P. Tu, "A New Algorithm for Partial Redundancy Elimination Based on SSA Form", in Proceedings of the ACM SIGPLAN '97 Conference on Programming Language Design and Implementation, pp. 273-286, Jun. 1997.

S. Carr, and Y. Guan, "Unroll-and-Jam Using Uniformly Generated Sets", in Proceedings of the 30th International Symposium on Microarchitecture, pp. 349-357, Dec. 1997.

D. A. Connors and W. Hwu. "Compiler-directed Dynamic Computation Reuse: Rationale and Initial Results," in Proceedings of the 32nd International Symposium on Microarchitecture, pp. 158-169, Nov. 1999.

* cited by examiner

| | | Left Operand | | |
|---|---|---|---|---|
| | | Loop Invariant Variable S1 | $A[a_1*i+b_1*j+c_1]...[a_n*i+b_n*j+c_n]$ | Others |
| Right Operand | Loop Invariant Variable S2 | Potential Reuse | Reuse when $a_1=a_2...=a_n$ and $b_1=b_2...=b_n$ | No Reuse |
| | $B[a'_1*i+b'_1*j+c'_1]...[a'_n*i+b'_n*j+c'_n]$ | Reuse when $a'_1=a'_2...=a'_n$ and $b'_1=b'_2...=b'_n$ | Reuse when $a_1=a'_1=a_2=a'_2...=a_n=a'_n$ and $b_1=b'_1=b_2=b'_2...=b_n=b'_n$ | No Reuse |
| | Others | No Reuse | No Reuse | No Reuse |

COMPUTATION REUSE FOR LOOPS WITH IRREGULAR ACCESSES

TECHNICAL FIELD

The present disclosure relates to reusing computations in nested loops with irregular accesses that are included in a computer program.

BACKGROUND

Software code may include a loop that resides within another loop. These loops are referred to as "nested loops," and may perform redundant calculations based upon their equation properties and variable ranges.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium result in an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
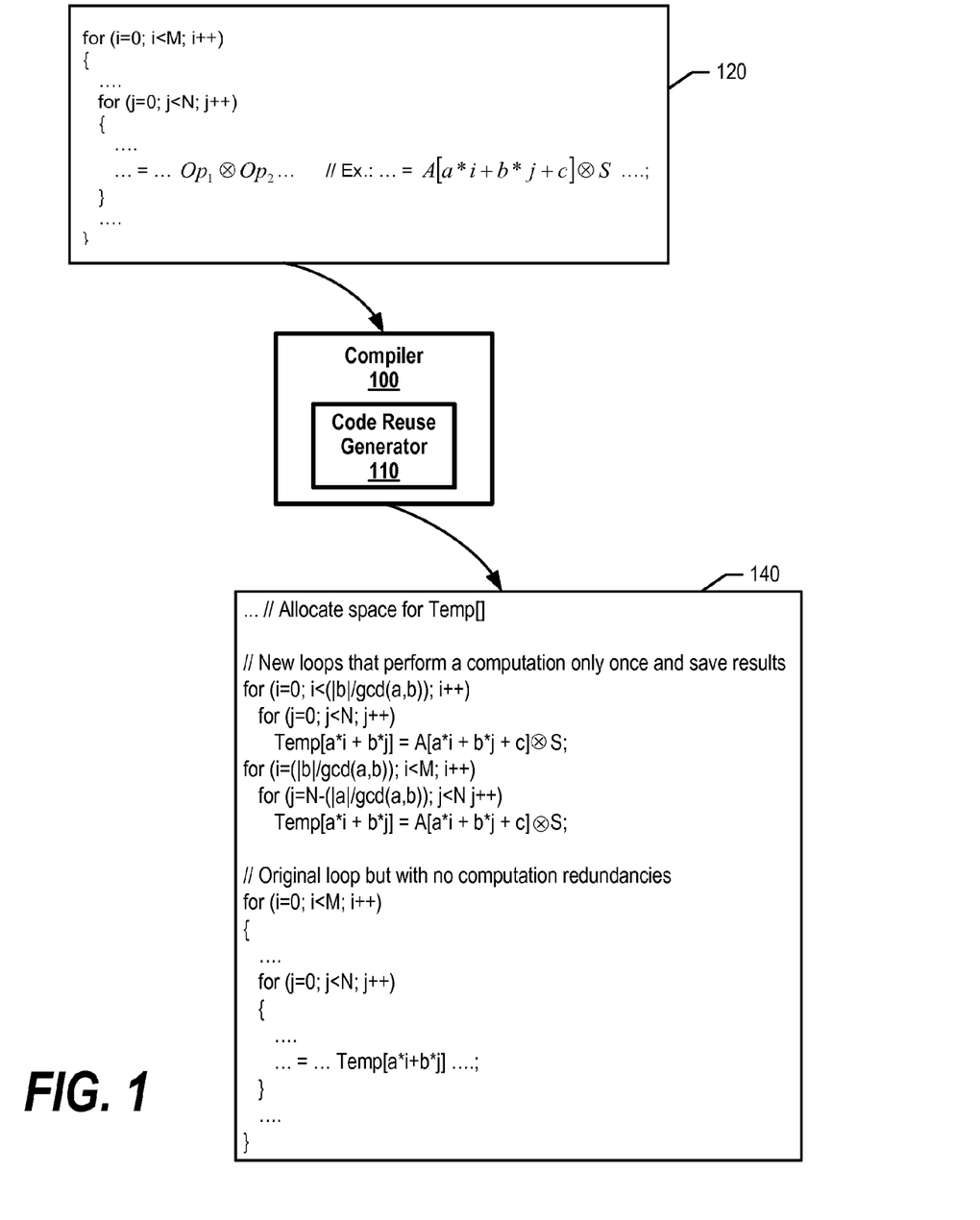
FIG. 1 is an exemplary diagram showing a code reuse generator transforming code that includes doubly nested loops.

FIG. 1 is an exemplary diagram showing a code reuse generator transforming code that includes doubly nested loops. As those skilled in the art can appreciate, a doubly nested loop includes an outer loop and an inner loop. Compiler 100 is a computer program (or set of programs) that transforms source code written in a computer language (e.g., source language) into another computer language (e.g., target language) Compiler 100 may execute, for example, on one or more of processors 1010 shown in FIG. 10. Compiler 100 includes code reuse generator 110, which identifies redundant calculations at compile time within doubly nested loops. Once identified, code reuse generator 110 generates code that performs particular computations one time, and then reuses the computation results as needed.

Code 120 includes a doubly nested loop that exhibits potential computation reuse opportunities ("i" is an outer induction variable and "j" is an inner induction variable). In the present disclosure, "A" represents an array and "$\otimes$" represents any operation such as +, −, *, etc. Code 120 includes an example of a loop model for the computation reuse transformation, and is a normalized doubly nested loop with no control flow and with computations involving irregular array accesses. In the present disclosure, an "irregular array access" in a doubly nested loop is an array access where at least one dimension of the array has an index composed of a linear expression of both inner and outer induction variables (e.g., i and j).

Code 120 includes the computation $A[a*i+b*j+c] \otimes S$. The second operand "S" is assumed to be invariant with respect to both loops (restrictions to the second operand are discussed below). The loop includes iteration (i,j), and performs the computation $A[a*i+b*j+c] \otimes S$. Iteration (i+b,j−a) also computes the expression $A[a*i+b*j+c] \otimes S$ due to the fact that iteration (i+b,j−a) of the loop computes iteration $A[a*(i+b)+b*(j-a)+c] \otimes S$, which is $A[a*i+a*b+b*j-a*b+c] \otimes S$, that can be written as $A[a*i+b*j+c] \otimes S$. In other words, any iteration of the form (i+n*b,j−n*a), where n is a positive or negative integer such that $0 \leq i+n*b \prec M$ and $0 \leq i-n*a \prec N$, also computes the expression $A[a*i+b*j+c] \otimes S$. As such, in order to find all opportunities for computation reuse, the iteration ($i_1$, $j_1$) computes the same expression as iteration (i,j) when a positive or negative integer n is identified such that $i_1=i+n*(b \div gcd(a,b))$ and $j_1=j-n*(a \div gcd(a,b))$, where "gcd" is the greatest common divisor.

A computation "Cmp" may be defined to be composed of an operation $\otimes$, and at most two source operands (Cmp=op1 $\otimes$ op2). Therefore, Cmp=$A[a*i+b*j+c] \otimes S$ in code 120. In one embodiment, computation "Cmp" is a candidate for reuse if at least one source operand of Cmp represents an array access. In this embodiment, the array access should be an irregular access so that code reuse generator 110 may take advantage of reuse opportunities.

Assuming the array access within the code 120's loop is of the form $A[a_1*i+b_1*j+c_1][a_2*i+b_2*j+c_2] \ldots [a_n*i+b_n*j+c_n]$, the irregular array access results in accessing elements of the array several times within the doubly nested loop if $a_1=a_2=\ldots=a_n$, and $b_1=b_2=\ldots=b_n$. Note that each of the array access coefficients above (i.e. $a_1, a_2, \ldots, a_n, b_1, b_2, \ldots, b_n, c_1, c_2, \ldots, c_n$) are loop invariant variables.

The second operand "S" may be scalar that is loop invariant with respect to both loops (i and j loops), or an array access with indexes having the same coefficients as the indexes of the array access as described above. For the latter case and assuming that the second operand is also an array of the form $B[a'_1*i+b'_1*j+c'_1][a'_2*i+b'_2*j+c'_2] \ldots [a'_n*i+b'_n*j+c'_n]$, then $$a_1=a'_1=a_2=a'_2=\ldots=a_n=a'_n, \text{ and } b_1=b'_1=b_2=b'_2=\ldots=b_n=b'_n.$$

After code reuse generator 110 identifies reuse opportunities, determines their reuse legality, and computes their profitability, code reuse generator 110 automatically transforms code 120 into code 140 (see FIGS. 3-7 and corresponding text for further details). As can be seen, code 140's first two loop nests perform computations (temporary variable computations) and save the computation results. Then, code 140's last loop nest corresponds to the original loop nest from code 120 but utilizes the saved computation results. Note that the computation reuse transformation saves the computation into a temporary array that is indexed by the expression $a*i+b*j$ since each reuse iteration maps to the same value of $a*i+b*j$. As those skilled in the art can appreciate, other embodiments may be utilized for storing the saving computation results.

In one embodiment, in order for two computations to be redundant and produce the same value, each of their corresponding operands should have the same value. In addition, in order for two operands to have the same value, both operands should access the same memory location.

Figure 2:
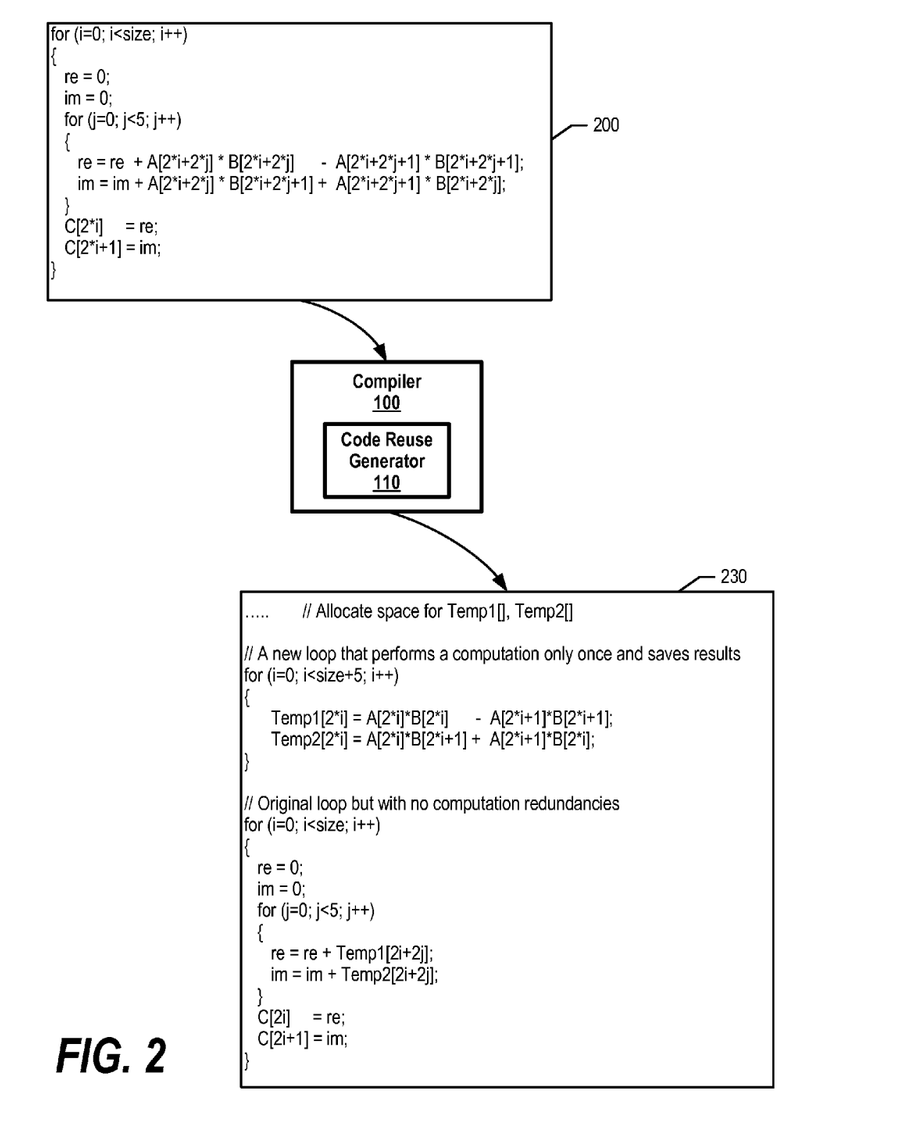
FIG. 2 is an exemplary diagram showing a code reuse generator transforming code that includes doubly nested loops.

FIG. 2 is an exemplary diagram showing a code reuse generator transforming code that includes doubly nested loops. Reuse opportunities exist for doubly nested loops that include computations with operands that are arrays with irregular memory accesses. Code reuse generator 110 identifies reuse opportunities, determines their reuse legality, computes their profitability, and automatically generates reuse code at compile time without using dynamic runtime checking overhead and without special hardware or profiling to assist in computation reuse.

The example shown in FIG. 2 shows code 200, which includes code from a digital signal processor (DSP) kernel routine. As can be seen, code 200 includes the computation $A[n]*B[n]$, which is redundantly computed several times within the doubly nested loop. For example, A[8]*B[8] is computed when the pair (i,j) is (0,4), (1,3), (2,2), (3,1), and (4,0). The computation A[8]*B[8] is computed five times within the loop even though the elements A[8] and B[8] and are not modified.

In addition, code 200 includes four multiplication computations, three addition computations, and one subtraction computation, each of which having several redundancies. As such, code reuse generator 110 generates code 230, which performs two computations (Temp1 and Temp2) and reuses the computation results in the original loop (see FIGS. 3-7 and corresponding text for further details).

In one embodiment, code 230 may include two extra loops before the original loop, in which case one loop performs the computations (generating redundant calculations) and the other loop stores the redundant calculations.

Figure 3:
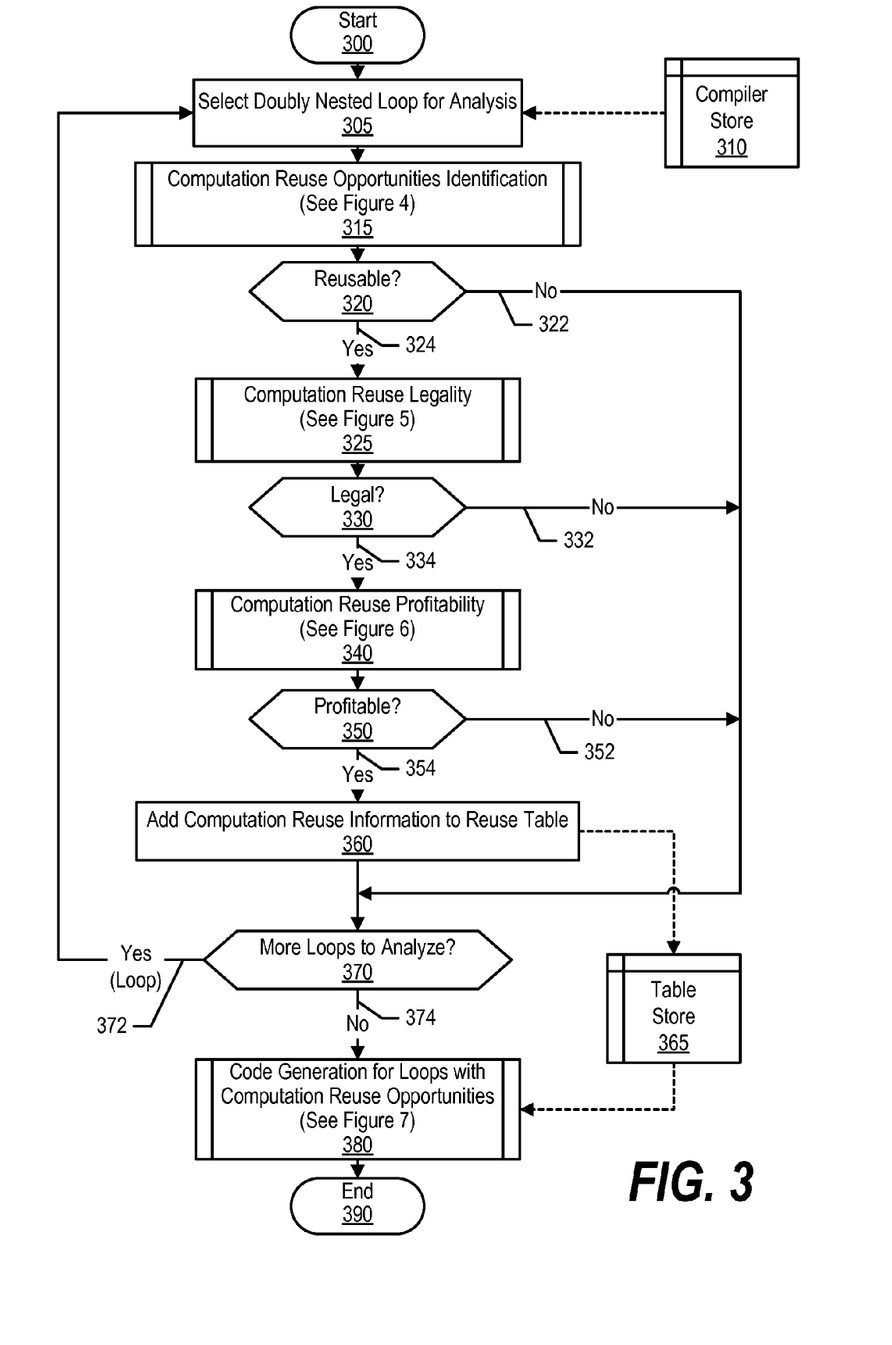
FIG. 3 is an exemplary high-level flowchart showing steps taken in generating reuse code.

FIG. 3 is an exemplary high-level flowchart showing steps taken in a compiler generating reuse code. Processing commences at 300, whereupon processing selects a doubly nested loop for analysis from compiler store 310 (step 305). Compiler store 310 is utilized by compiler 100 to process code. Compiler store 310 may be stored on a volatile or nonvolatile storage area, such as computer memory or a computer hard drive.

Figure 4:
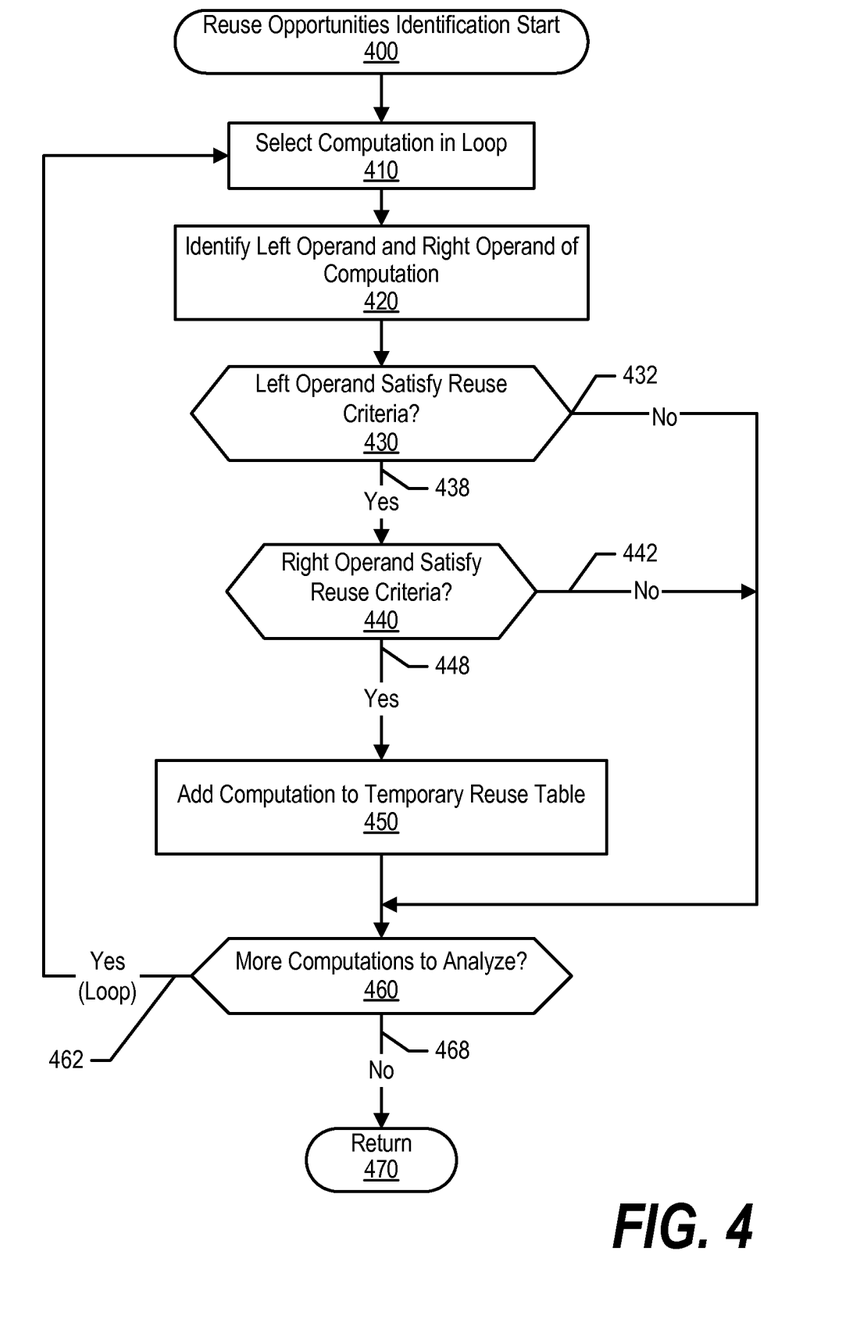
FIG. 4 is an exemplary flowchart showing steps taken in identifying whether a selected doubly nested loop is a candidate for reuse code.

Processing identifies reuse opportunities for the selected doubly nested loop based upon particular reuse criteria (pre-defined process block 315, see FIG. 4 and corresponding text for further details). Next, a determination is made as to whether the selected doubly nested loop is reusable based upon the reuse criteria, such as whether the loop includes an irregular array access (decision 320). If the selected doubly nested loop is not reusable, decision 320 branches to "No" branch 322 bypassing further computation reuse analysis. On the other hand, if the selected doubly nested loop is reusable, decision 320 branches to "Yes" branch 324 whereupon processing determines the doubly nested loop's "legality," such as its data dependence legality (e.g., input, flow, etc.) and non-data dependence legality (e.g., countable iterations) (pre-defined process block 325, see FIG. 5 and corresponding text for further details). A determination is made as to whether the selected doubly nested loop is legal (decision 330). If the selected doubly nested loop is not legal, decision 330 branches to "No" branch 332 bypassing further computation reuse analysis steps.

Figure 6:
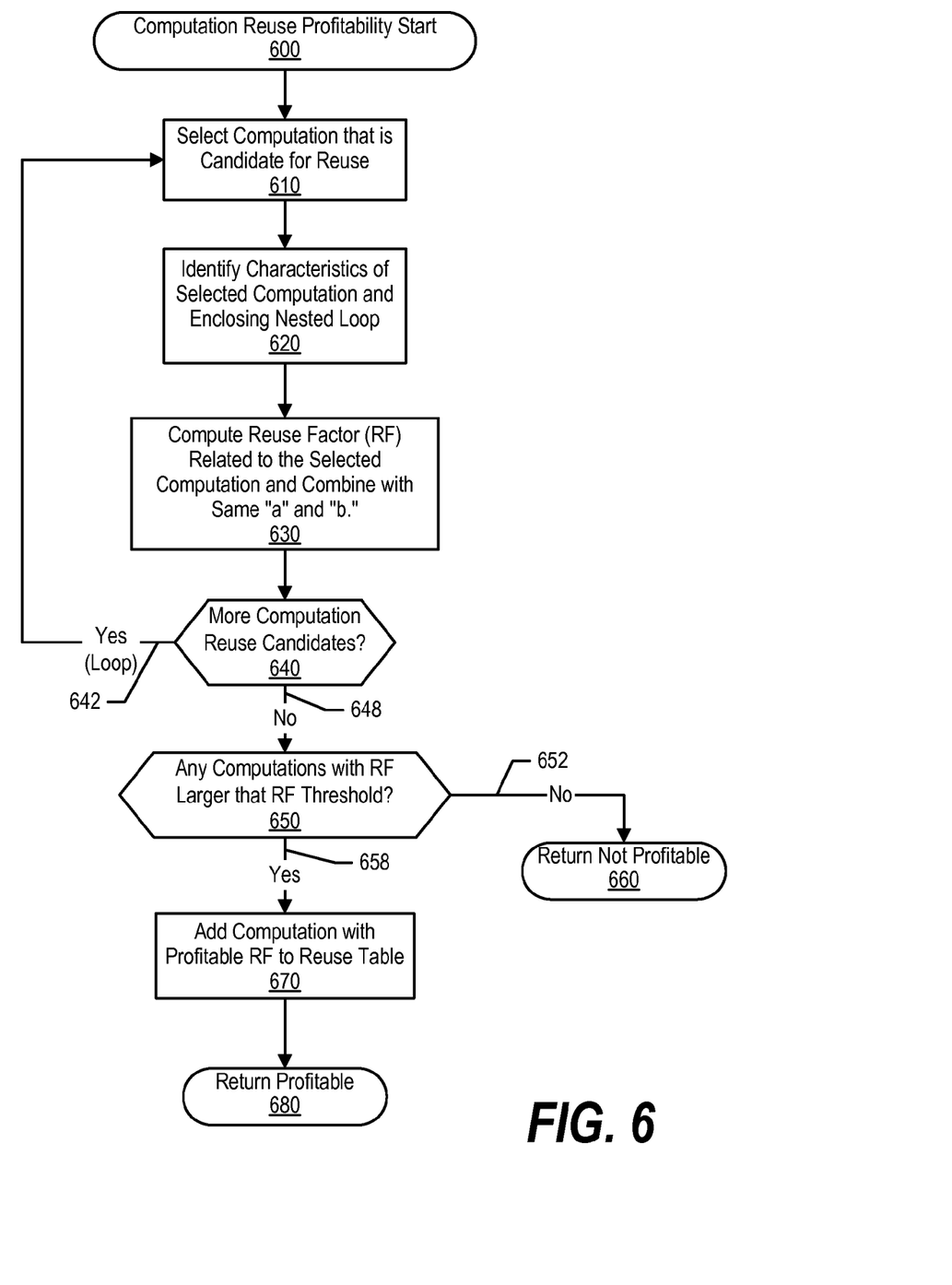
FIG. 6 is an exemplary flowchart showing steps taken in identifying a doubly nested loop's reuse profitability.

On the other hand, if the selected doubly nested loop is legal, decision 330 branches to "Yes" branch 334, whereupon processing proceeds through a series of steps to identify the selected doubly nested loop's profitability, which corresponds to the amount of times that a computation's result may be reused in the doubly nested loop (pre-defined process block 340, see FIG. 6 and corresponding text for further details).

A determination is made as to whether the selected doubly nested loop is profitable (decision 350). If the selected doubly nested loop is not profitable, decision 350 branches to "No" branch 352 bypassing further reuse analysis steps. On the other hand, if the selected doubly nested loop is profitable, decision 350 branches to "Yes" branch 354, whereupon processing adds computation reuse information (loop with computation reuse opportunities) for the selected doubly nested loop to table store 365 (step 360). For example, referring to FIG. 1, loop i and j are stored, along with the computation $A[a*i+b*j+c] \otimes S$. In one embodiment, more than one computation may be stored (shown in FIG. 2). In another embodiment, an entire loop may not be stored, or an entire computation may not be stored because a compiler may have its own internal data structure, which may store a loop identifier and a computation identifier. Table store 365 may be stored on a nonvolatile storage area, such as a computer hard drive.

A determination is made as to whether there are more doubly nested loops to analyze (decision 370). If there are more doubly nested loops to analyze, decision 370 branches to "Yes" branch 372, which loops back to select and process the next doubly nested loop. This looping continues until there are no more doubly nested loop to analyze, at which point decision 370 branches to "No" branch 374.

Figure 7:
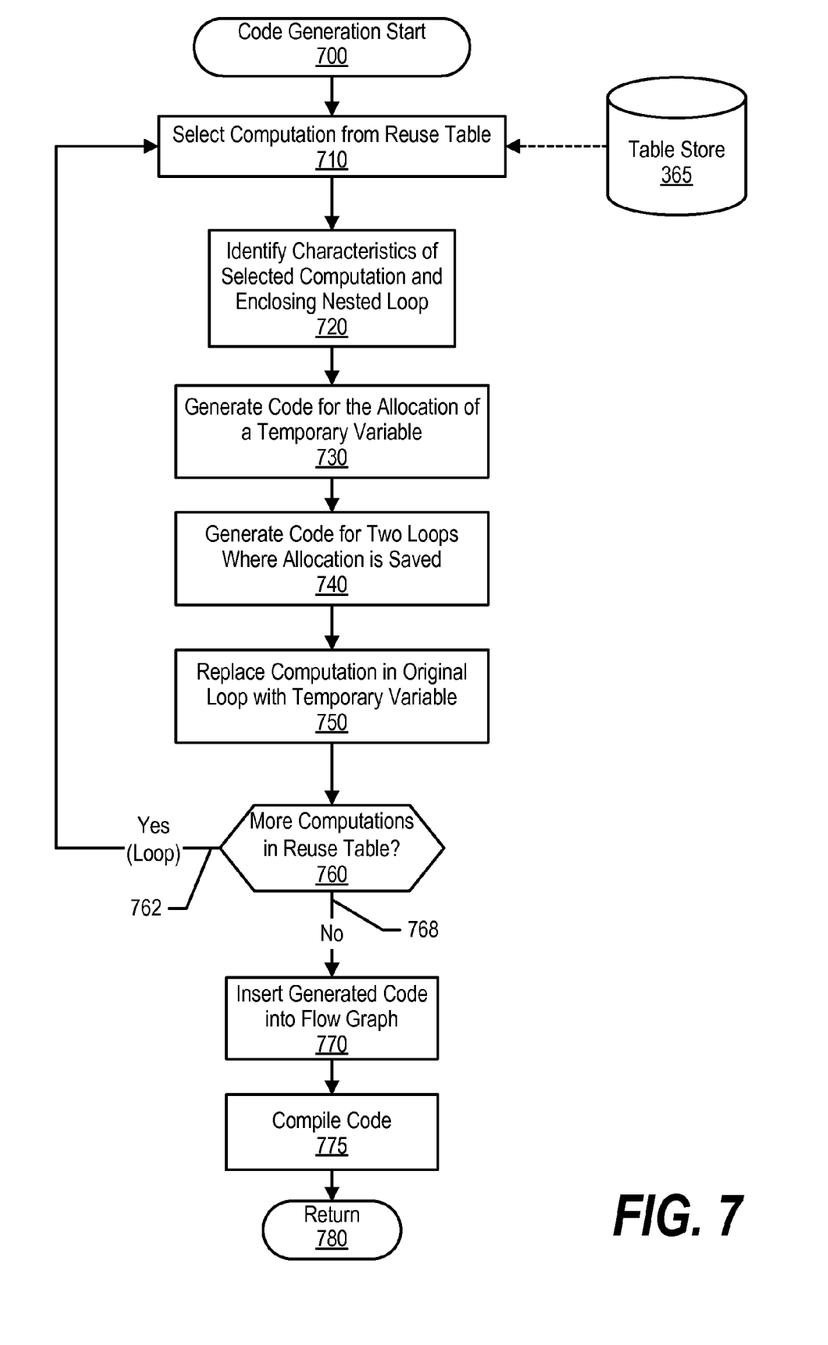
FIG. 7 is an exemplary flowchart showing steps taken in generating code for doubly nested loops.

Processing then generates reuse code for each of the identified doubly nested loops that are candidates for reuse stored in table store 365 (pre-defined process block 380, see FIG. 7 and corresponding text for further details). Processing ends at 390.

FIG. 4 is an exemplary flowchart showing steps taken in identifying whether a selected doubly nested loop is a candidate for reuse code. Processing commences at 400, whereupon processing selects a computation in the selected doubly nested loop (step 410). At step 420, processing identifies a left operand and a right operand of the computation, such as $A[a*i+b*j+c] \otimes S$ shown in FIG. 1.

A determination is made as to whether the left operand satisfies particular reuse criteria (decision 430). In one embodiment as discussed above, computation "Cmp" is a candidate for reuse if at least one source operand of Cmp represents an irregular array access. In this embodiment, assuming the array access is of the form $A[a_1*i+b_1*j+c_1][a_2*i+b_2*j+c_2] \ldots [a_n*i+b_n*j+c_n]$, the irregular array access results in accessing elements of the array several times within the doubly nested loop if $a_1=a_2=\ldots=a_n$, and $b_1=b_2=\ldots=b_n$. Note that the array access coefficients above (i.e. $a_1, a_2, \ldots, a_n, b_1, b_2, \ldots, b_n, c_1, c_2, \ldots, c_n$) are loop invariant variables (e.g., do not vary throughout loop calculations).

If the left operand does not satisfy the reuse criteria, decision 430 branches to "No" branch 432. On the other hand, if the left operand satisfies the reuse criteria, decision 430 branches to "Yes" branch 438 whereupon a determination is made as to whether the right operand satisfies the reuse criteria (decision 440). In one embodiment discussed above, the right operand "S" may be scalar that is loop invariant with respect to both loops (i and j loops), or an array access with indexes having the same coefficients as the indexes of the array access as described above. Assuming that the second operand is also an array of the form $B[a'_1*i+b'_1*j+c'_1][a'_2*i+b'_2*j+c'_2] \ldots [a'_n*i+b'_n*j+c'_n]$, then a reuse criteria may be:

$$a_1=a'_1=a_2=a'_2=\ldots=a_n=a'_n, \text{ and } b_1=b'_1=b_2=b'_2=\ldots=b_n=b'_n.$$

If the right operand does not satisfy the reuse criteria, decision 440 branches to "No" branch 442. On the other hand, if the left operand satisfies the reuse criteria, decision 440 branches to "Yes" branch 448 whereupon processing adds the selected computation to a temporary reuse table (step 450) (see FIG. 9 and corresponding text for further details).

A determination is made as to whether there are more computations in the selected doubly nested loop to analyze (decision 460). If there are more computations to analyze, decision 460 branches to "Yes" branch 462, which loops back to select and process the next computation. This looping continues until there are no more computations to analyze, at which point decision 460 branches to "No" branch 468 whereupon processing returns at 470.

In one embodiment, processing may handle computation reuse within n-nested loops by formally generalizing all components of computation reuse transformation (legality, identifying reuse opportunities, code generation, profitability analysis, etc.) to address reuse optimization for any nested loop. In another embodiment, processing may handle computation reuse within n-nested loops by identifying reuse opportunities in any doubly nested loop within the n-nested loop.

Figure 5:
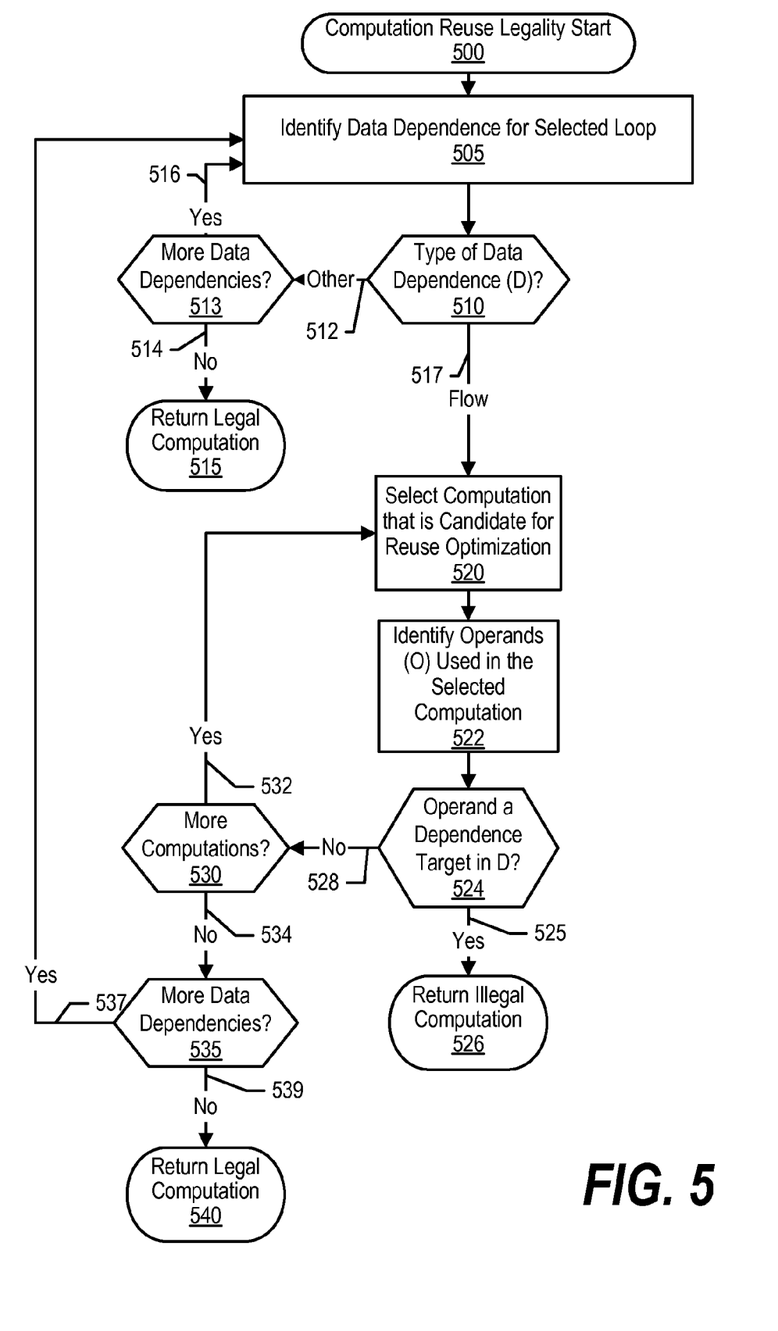
FIG. 5 is an exemplary flowchart showing steps taken in identifying the legality of a particular doubly nested loop.

FIG. 5 is an exemplary flowchart showing steps taken in identifying the legality of a particular doubly nested loop. Once reuse opportunities are identified (FIG. 4), processing determines whether the doubly nested loop may be transformed based upon dependencies. In one embodiment, the computation reuse transformation mainly consists of creating extra loops where all computations with reuse opportunities are performed once and saved into temporary arrays. In this embodiment, the saved computation results are then used in the original loop and, in order to be able to safely perform this transformation, the optimized code must behave identically to the original code. As such, legality criteria may be divided into two parts, which are data dependence legality and non-data dependence legality.

Regarding data dependence legality, computation reuse transformation performs the computations in a different order than the order in the original loop. This out-of-order execution may affect code correctness if restrictions are not imposed related to data dependencies between the iterations. In general, processing may analyze four types of data dependencies in order to determine whether the dependence type would disallow transformation, which are input dependencies, flow dependencies, and output dependencies.

Regarding non-data dependence legality, one non-data dependence legality may exist that requires the doubly nested loop to have a countable (finite) number of iterations for both inner loop (inner variable range) and outer loop (outer variable range). For simplicity, the flowchart shown in FIG. 5 does not include a decision step for determining whether a doubly nested loop is non-data dependence legal.

Processing commences at 500, whereupon processing identifies a data dependence for the selected loop at step 505. A determination is made as to the type of the selected loop's data dependence (decision 510). If the dependence is not flow dependence, decision 510 branches to "Other" branch 512, whereupon a determination is made as to whether the selected loop has more data dependencies (decision 513). If the selected loop does not have more data dependencies, decision 513 branches to "No" branch 514, whereupon upon processing returns a legal computation indication at 515. On the other hand, if the selected loop includes more data dependencies, decision 513 branches to "Yes" branch 516 to identify and process the selected loop's next data dependency.

When the data dependence is a flow dependence, decision 510 branches to "Flow" branch 517, whereupon processing selects the computation that is a candidate for reuse optimization (step 520), and identifies operands used in the selected computation (step 522). A determination is made as to whether the operand is a dependence target (decision 524). If the operand is a dependence target, decision 524 branches to "Yes" branch 525 whereupon processing returns an illegal computation indication at 526.

On the other hand, if the operand is not a dependence target, decision 524 branches to "No" branch 528, whereupon a determination is made as to whether there are more computations corresponding to the identified data dependence (decision 530). If there are more computations, decision 530 branches to "Yes" branch 532, which loops back to select another computation. On the other hand, if there are no more computations, decision 530 branches to "No" branch 534.

A determination is made as to whether there are more data dependencies (decision 535). If there are no more data dependencies, decision 535 branches to "No" branch 539, whereupon processing returns a legal computation indication at 540. On the other hand, if there are more data dependencies, decision 535 branches to "Yes" branch 537, which loops back to identify and process another data dependency within the selected loop.

FIG. 6 is an exemplary flowchart showing steps taken in identifying a doubly nested loop's reuse profitability. Computation reuse may involve overhead for extra loops and storing computation results into temporary arrays. In one embodiment, the profitability analysis may be simplified by focusing on the computation itself.

Processing commences at 500, whereupon processing selects a computation within a doubly nested loop that is a candidate for reuse (step 610). Next, processing identifies characteristics of the selected computation and enclosing the nested loop. Processing then computes a reuse factor (RF) related to the selected computation (redundant calculation) and combines with the same "a" and "b" at step 630. Referring to FIG. 2, "a" and "b" refer to the array access coefficients in A[a*i+b*j+c], such as a=2 and b=2. When computing the reuse factor, more than one computation with reuse opportunities is taken into consideration. These computations are computed and saved in the same loop before the original loop. Other computations with other "a" and "b" are computed and saved in other loops before the original loop. Referring to code 120 shown in FIG. 1, the computation A[a*i+b*j+c]⊗S is performed N*M times. Applying computation reuse as described previously, the computation is performed a number of times equal to $$((b \div gcd(a,b))*N) + ((a \div gcd(a,b))*(M - b \div gcd(a,b)))$$

By defining a reuse factor "RF" as the number of computations performed in the non-optimized loop nest (non-optimized calculations quantity) divided by the number of computations performed when computation reuse transformation is applied (optimized calculations quantity) (see code 140 in FIG. 1), then $$RF = (M*N) \div (((b+gcd(a,b))*N) + ((a \div gcd(a,b))*(M - b \div gcd(a,b))))$$

which may be expressed as $$RF = (M*N) \div (b'*N + a'*M - c')$$

where $b' = b \div gcd(a,b)$, $a' = a \div gcd(a,b)$, and $c' = -a*b \div gcd(a,b)^2$. Considering the parameters M=200, N=100, a=6, b=8, and c=1, then $$RF = 20000 \div (4*100 + 3*200 - 12) \approx 20$$

The reuse factor computed above gives a good indication on the usefulness of the computation reuse optimization. A determination is made as to whether there are more computation reuse candidates (decision 640). If there are more computation reuse candidates, decision 640 branches to "Yes" branch 642, which loops back to select and process the next computation. This looping continues until there are no more candidates to process, at which point decision 640 branches to "No" branch 648.

A determination is made as to whether there are any computations that have a reuse factor larger than a particular reuse factor threshold (decision 650). If no computations have a corresponding reuse factor than is larger than the reuse threshold, decision 650 branches to "No" branch 652 whereupon processing returns a not profitable indication at 660.

On the other hand, if one or more computations have a corresponding reuse factor that is larger than the reuse threshold, decision 650 branches to "Yes" branch 658 whereupon processing adds the computations with a profitable reuse factor to the reuse table at step 670, and processing returns a profitable indication at 680.

Figure 8:
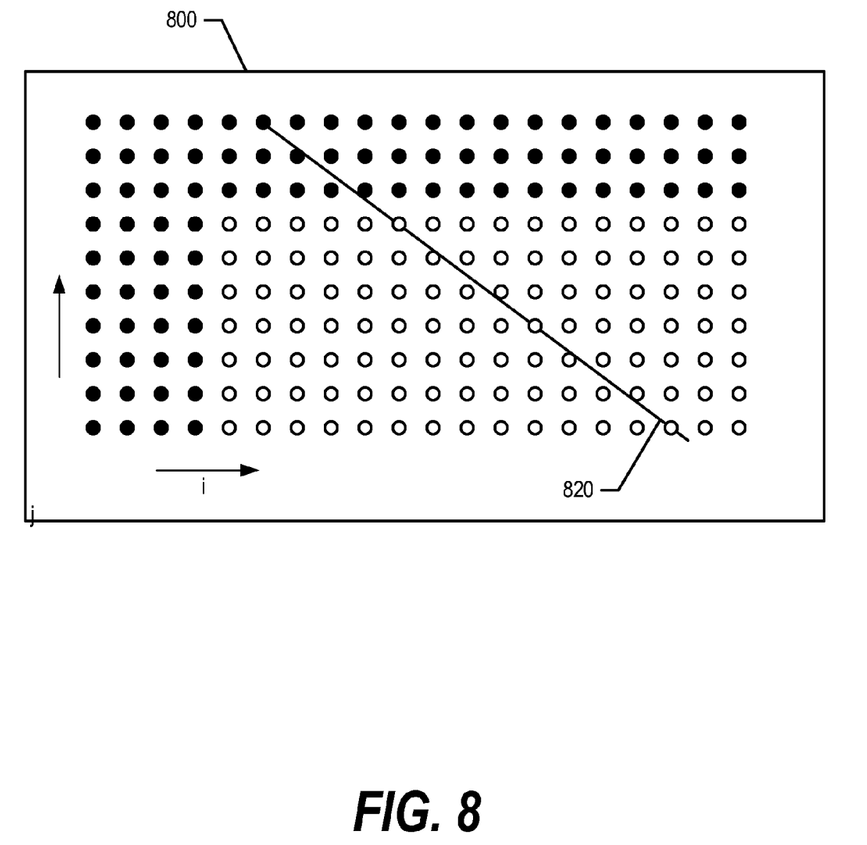
FIG. 8 is an exemplary diagram showing an iteration space view.

FIG. 7 is an exemplary flowchart showing steps taken in generating code for doubly nested loops. Processing commences at 700, whereupon processing selects a computation from table store 365 that has been identified as a candidate for reuse (step 710). At step 720, processing identifies characteristics of the selected computation and enclosing the nested loop. Referring to FIG. 1, assume M=20, N=10, a=6, b=8, and c=1. In this example, the computation with redundancies is A[6*i+8*j+1]⊗S and the four iterations (17,0), (13,3), (9,6), and (5,9) perform the same computation of A[103]⊗S. FIG. 8 shows an iteration space for a doubly nested loop with a loop trip count of 20 for code 120's i-loop, and a loop trip count of 10 for code 120's j-loop. Each dot represents a single iteration in the doubly nested loop. FIG. 8's line 820 represents 6*i+8*j+1=103 and intersects iterations (17,0), (13,3), (9,6), and (5,9) (see FIG. 8 and corresponding text for further details).

Next, processing generates code (temporary variable computation) for the allocation of a temporary (TEMP) variable (step 730), and generates code for two loops where the allocation is saved (step 740). Processing replaces the computation in the original loop with the temporary variable at step 750.

A determination is made as to whether there are more computations in the reuse table (decision 760). If there are more computations, decision 760 branches to "Yes" branch 762, which loops back to select and process the next computation. This looping continues until there are no more computations to process, at which point decision 760 branches to "No" branch 768. At step 770, processing inserts the generated code into a flow graph, compiles the code (step 775), and returns at 780.

FIG. 8 is an exemplary diagram showing an iteration space view. View 800 corresponds to code 120 shown in FIG. 1 where M=20, N=10, a=6, and b=8. View 800's empty dots are iterations with redundant calculations, and line 820 represents the equation 6*i+8*j+1=103, which is equivalent to j=−0.75*i+12.75. Each of iterations (17,0), (13,3), (9,6), and (5,9) have a computation result of 103 and, as can be seen, reside along line 820. The iteration space is composed of many other lines that link several dots having similar computation results.

Therefore, by saving results for the computation A[6*i+8*j+1]⊗S for the iterations represented by the solid dots in FIG. 8, then none of the computations for the iterations represented by the empty dots are required. As such, 200 (20*10=200) computations (all dots) may be reduced to 88 computations (solid dots).

Figure 9:
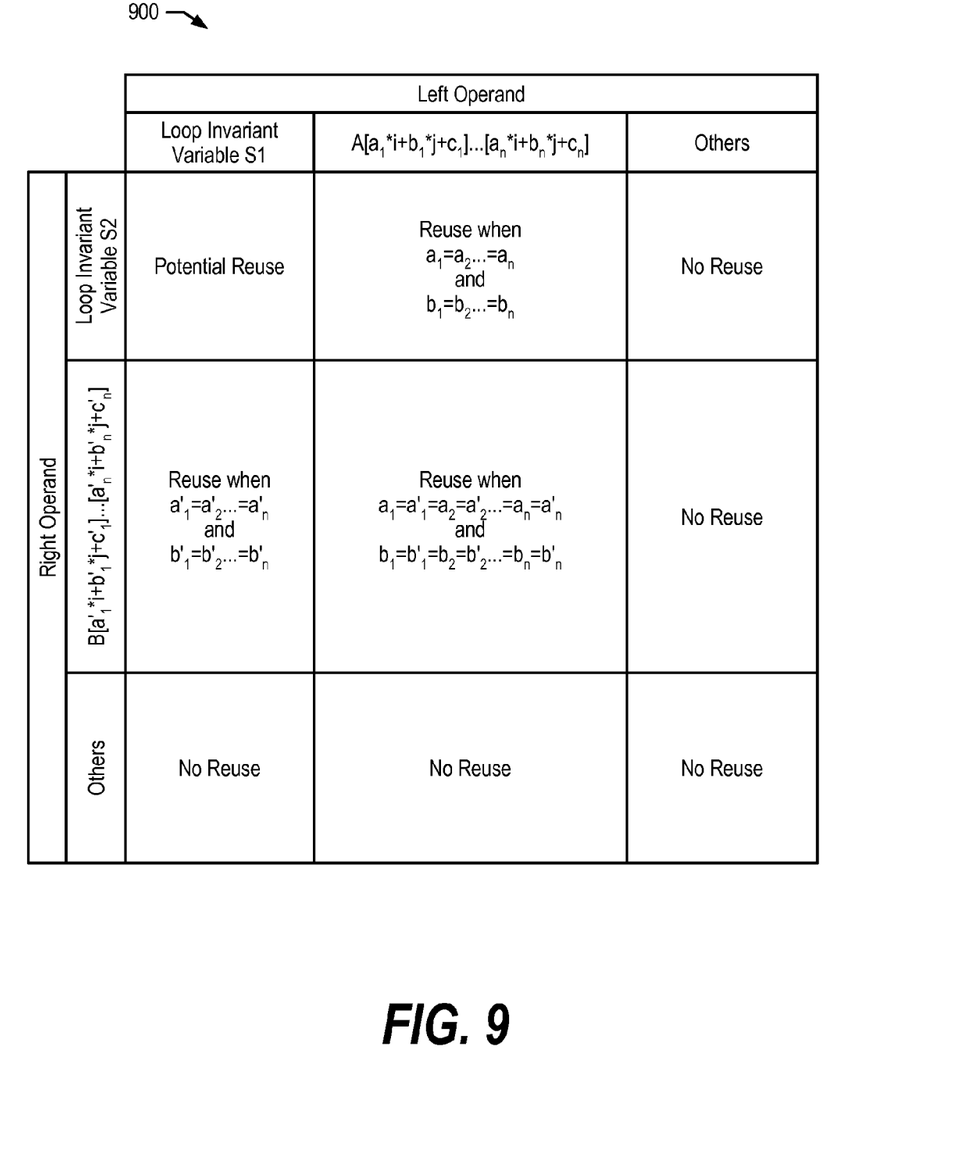
FIG. 9 is an exemplary table showing reuse potential based right operand and left operand properties.

FIG. 9 is an exemplary table showing reuse potential based upon properties of a computation's right operand and left operand. Table 900's example is a tabular summary of the steps taken in FIG. 4 to determine reusability. As those skilled in the art can appreciate and discussed above, table 900 may be extended to cover computations that include more than two operands.

Table 900 shows that a computation may be a candidate for reuse code when 1) both left operand and right operand are loop invariant; or 2) one of the operands represents an irregular array access while the other operand is either loop invariant or also represents an irregular array access (provided that the variables meet the criteria shown in table 900. Table 900 also shows that a computation may not be a candidate for reuse code when one of the operands is neither a loop invariant variable nor represents an irregular array access.

Figure 10:
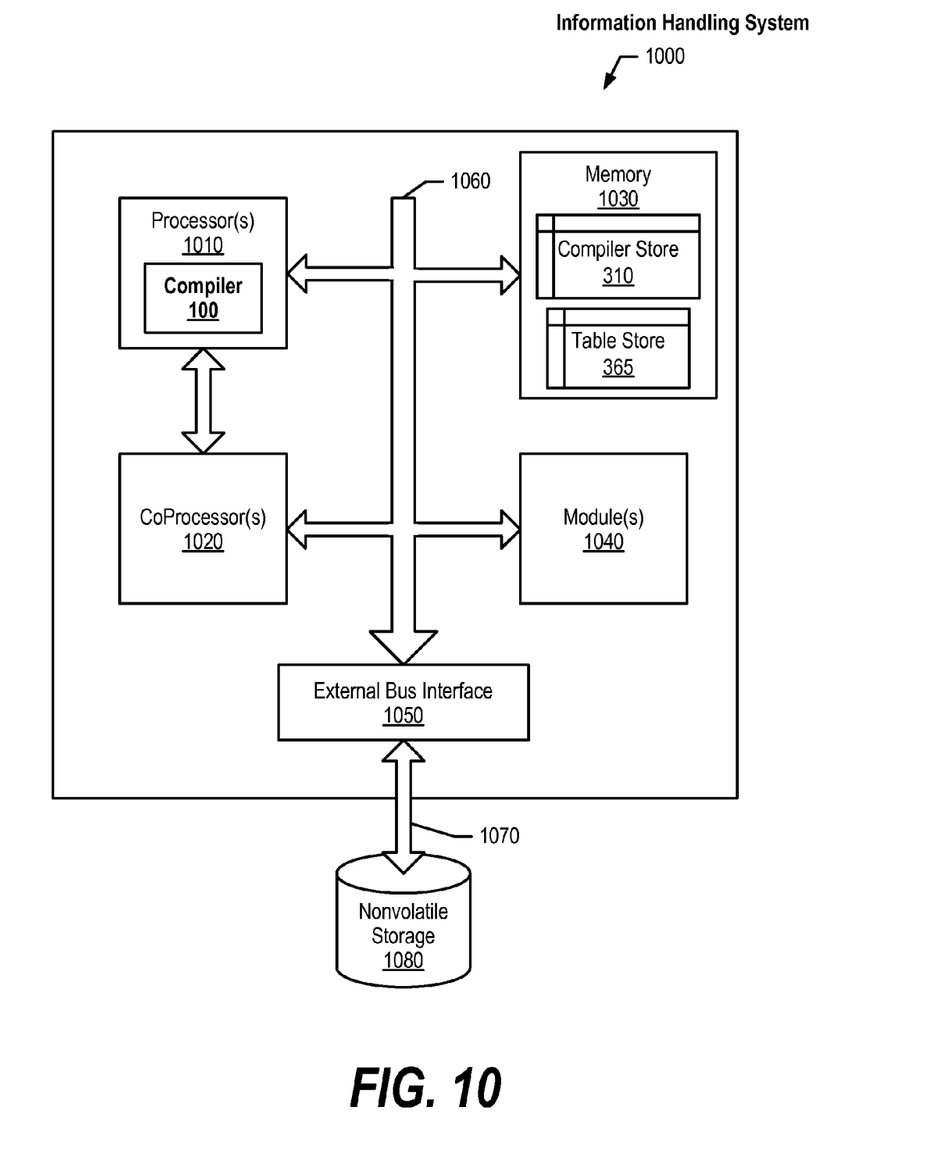
FIG. 10 illustrates an exemplary simplified example of a computer system capable of performing the computing operations described herein.

FIG. 10 illustrates information handling system 1000, which is a simplified example of a computer system capable of performing the computing operations described herein. Information handling system 1000 includes processor(s) 1010, co-processor(s) 1020, memory 1030, module(s) 1040, and external bus interface 1050, which are all bi-directionally coupled by way of bus 1060. Information handling system 1000 may couple to external systems by way of external bus 1070, such as a USB bus, an Ethernet bus, and etcetera. External bus 1070 may also couple to storage devices, such as nonvolatile storage device 1080. As discussed earlier, compiler 100 is a computer program (or set of programs) that transforms source code written in a computer language (e.g., source language) into another computer language (e.g., target language). Compiler 100 may be initially stored on a computer readable storage medium (e.g., CD ROM) and loaded onto information handling system 1000, where it is stored, for example, in nonvolatile storage device 1080 and/or memory 1030. When processor(s) 1010 execute compiler 100, compiler 100 is retrieved from the appropriate storage area and may be loaded onto processor(s) 1010 for execution.

While FIG. 10 shows one information handling system, an information handling system may take many forms. For example, an information handling system may take the form of a desktop, server, portable, laptop, notebook, netbook, embedded system, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting a nested loop within software code that includes an outer loop and an inner loop, the outer loop including an outer induction variable and the inner loop including an inner induction variable;
   identifying, by one or more processors, a computation included in the nested loop that generates an irregular array access, wherein the irregular array access includes an expression of both the outer induction variable and the inner induction variable;
   identifying, by one or more of the processors, a redundant calculation for the computation based upon the outer induction variable and the inner induction variable;
   generating, by one or more of the processors, a temporary variable that corresponds to the identified redundant calculation;
   replacing, by one or more of the processors, the computation with the temporary variable in the nested loop; and
   compiling the nested loop that includes the temporary variable.

2. The method of claim 1 further comprising:
   identifying a first operand and a second operand included in the computation; and
   determining that the computation is reusable based upon:
      detecting that the first operand generates the irregular array access; and
      detecting that the second operand is loop invariant with respect to the outer loop and the inner loop.

3. The method of claim 1 further comprising:
   identifying a first operand and a second operand included in the computation; and
   determining that the computation is reusable based upon:
      detecting that the first operand generates the irregular array access; and
      detecting that the second operand generates a subsequent irregular array access having similar array access coefficients as the first operand.

4. The method of claim 1 further comprising:
   identifying a first operand and a second operand included in the computation; and
   determining that the computation is legal based upon:
      determining that the first operand and the second operand fail to be a dependence target; and
      determining that an outer variable range corresponding to the outer induction variable and an inner variable range corresponding to the inner induction variable are finite.

5. The method of claim 1 further comprising:
   computing a reuse factor for the computation, wherein the reuse factor includes a non-optimized calculations quantity compared with an optimized calculations quantity; and
   determining that reusing the redundant calculation is profitable based upon comparing the reuse factor with a reuse threshold.

6. The method of claim 1 further comprising:
   including a temporary variable computation in the software code, the temporary variable computation residing external to the nested loop and generating a computation result for the temporary variable; and
   compiling the software code with the included temporary variable computation.

7. The method of claim 1 wherein the nested loop resides within an n-nested loop.

8. A system comprising:
   one or more processors;
   a memory accessible by at least one of the processors;
   a set of instructions stored in the memory and executed by at least one of the processors in order to perform actions of:
      selecting a nested loop within software code that includes an outer loop and an inner loop, the outer loop including an outer induction variable and the inner loop including an inner induction variable;
      identifying a computation included in the nested loop that generates an irregular array access, wherein the irregular array access includes an expression of both the outer induction variable and the inner induction variable;
      identifying a redundant calculation for the computation based upon the outer induction variable and the inner induction variable;
      generating a temporary variable that corresponds to the identified redundant calculation;
      replacing the computation with the temporary variable in the nested loop; and
      compiling the nested loop that includes the temporary variable.

9. The system of claim 8 wherein the set of instructions when executed by one or more of the processors further performs actions of:
   identifying a first operand and a second operand included in the computation; and
   determining that the computation is reusable based upon:
      detecting that the first operand generates the irregular array access; and
      detecting that the second operand is loop invariant with respect to the outer loop and the inner loop.

10. The system of claim 8 wherein the set of instructions when executed by one or more of the processors further performs actions of:
    identifying a first operand and a second operand included in the computation; and
    determining that the computation is reusable based upon:
       detecting that the first operand generates the irregular array access; and
       detecting that the second operand generates a subsequent irregular array access having similar array access coefficients as the first operand.

11. The system of claim 8 wherein the set of instructions when executed by one or more of the processors further performs actions of:
    identifying a first operand and a second operand included in the computation; and
    determining that the computation is legal based upon:
       determining that the first operand and the second operand fail to be a dependence target; and
       determining that an outer variable range corresponding to the outer induction variable and an inner variable range corresponding to the inner induction variable are finite.

12. The system of claim 8 wherein the set of instructions when executed by one or more of the processors further performs actions of:

computing a reuse factor for the computation, wherein the reuse factor includes a non-optimized calculations quantity compared with an optimized calculations quantity; and determining that reusing the redundant calculation is profitable based upon comparing the reuse factor with a reuse threshold.

13. The system of claim 8 wherein the set of instructions when executed by one or more of the processors further performs actions of:

including a temporary variable computation in the software code, the temporary variable computation residing external to the nested loop and generating a computation result for the temporary variable; and compiling the software code with the included temporary variable computation.

14. The system of claim 8 wherein the nested loop resides within an n-nested loop.

15. A computer program product stored in a computer readable storage medium, comprising functional descriptive material that, when executed by an information handling system, causes the information handling system to perform actions that include:

selecting a nested loop within software code that includes an outer loop and an inner loop, the outer loop including an outer induction variable and the inner loop including an inner induction variable;

identifying a computation included in the nested loop that generates an irregular array access, wherein the irregular array access includes an expression of both the outer induction variable and the inner induction variable;

identifying a redundant calculation for the computation based upon the outer induction variable and the inner induction variable;

generating a temporary variable that corresponds to the identified redundant calculation;

replacing the computation with the temporary variable in the nested loop; and compiling the nested loop that includes the temporary variable.

16. The computer program product of claim 15 comprising functional descriptive material that, when executed by the information handling system, causes the information handling system to further performs actions of:

identifying a first operand and a second operand included in the computation; and determining that the computation is reusable based upon:
detecting that the first operand generates the irregular array access; and detecting that the second operand is loop invariant with respect to the outer loop and the inner loop.

17. The computer program product of claim 15 comprising functional descriptive material that, when executed by the information handling system, causes the information handling system to further performs actions of:

identifying a first operand and a second operand included in the computation; and determining that the computation is reusable based upon:
detecting that the first operand generates the irregular array access; and detecting that the second operand generates a subsequent irregular array access having similar array access coefficients as the first operand.

18. The computer program product of claim 15 comprising functional descriptive material that, when executed by the information handling system, causes the information handling system to further performs actions of:

identifying a first operand and a second operand included in the computation; and determining that the computation is legal based upon:
determining that the first operand and the second operand fail to be a dependence target; and determining that an outer variable range corresponding to the outer induction variable and an inner variable range corresponding to the inner induction variable are finite.

19. The computer program product of claim 15 comprising functional descriptive material that, when executed by the information handling system, causes the information handling system to further performs actions of:

computing a reuse factor for the computation, wherein the reuse factor includes a non-optimized calculations quantity compared with an optimized calculations quantity; and determining that reusing the redundant calculation is profitable based upon comparing the reuse factor with a reuse threshold.

20. The computer program product of claim 15 comprising functional descriptive material that, when executed by the information handling system, causes the information handling system to further performs actions of:

including a temporary variable computation in the software code, the temporary variable computation residing external to the nested loop and generating a computation result for the temporary variable; and compiling the software code with the included temporary variable computation.

* * * * *